United States Patent
Yasui et al.

(10) Patent No.: US 8,116,942 B2
(45) Date of Patent: Feb. 14, 2012

(54) STEERING ANGLE CONTROL APPARATUS FOR VEHICLE

(75) Inventors: Yoshiyuki Yasui, Nagoya (JP); Hiroaki Aizawa, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1121 days.

(21) Appl. No.: 11/984,519

(22) Filed: Nov. 19, 2007

(65) Prior Publication Data
US 2008/0119988 A1    May 22, 2008

(30) Foreign Application Priority Data

Nov. 22, 2006   (JP) ................................. 2006-315630

(51) Int. Cl.
*G05D 1/00* (2006.01)
*B62D 6/00* (2006.01)

(52) U.S. Cl. ............... 701/41; 701/48; 701/73; 701/91; 180/197; 180/415; 303/140; 303/148

(58) Field of Classification Search ................... 701/42, 701/69.73, 89, 91; 303/147, 149
See application file for complete search history.

(56) References Cited

U.S. PATENT DOCUMENTS

| | | | |
|---|---|---|---|
| 4,733,878 A * | 3/1988 | Kanazawa et al. ............ 180/415 |
| 4,939,653 A * | 7/1990 | Tsurumiya et al. ............. 701/41 |
| 5,035,295 A | 7/1991 | Leiber et al. |
| 5,089,967 A | 2/1992 | Haseda et al. |
| 6,863,356 B2 | 3/2005 | Hackl et al. |
| 7,330,785 B2 | 2/2008 | Odenthal et al. |
| 2002/0143451 A1 * | 10/2002 | Hac et al. ........................ 701/48 |
| 2008/0077295 A1 * | 3/2008 | Holzmann et al. ............. 701/43 |

FOREIGN PATENT DOCUMENTS

| | | |
|---|---|---|
| DE | 38 26 982 A1 | 2/1989 |
| DE | 39 16 354 A1 | 11/1990 |
| DE | 40 38 079 A1 | 6/1992 |
| DE | 100 53 604 A1 | 5/2002 |
| DE | 10 2004 035 004 A1 | 2/2006 |
| JP | 2540742 B2 | 7/1996 |

OTHER PUBLICATIONS

Office Action dated Oct. 4, 2010, issued by the German Patent Office in corresponding German Patent Application No. 10 2007 000 650, and English language translation of the Office Action.

* cited by examiner

*Primary Examiner* — Thomas Black
*Assistant Examiner* — Lin B Olsen
(74) *Attorney, Agent, or Firm* — Buchanan Ingersoll & Rooney PC (57) ABSTRACT

A steering angle control apparatus for a vehicle includes a first calculating means calculating a longitudinal force, a second calculating device calculating a longitudinal force difference between at least one of right side wheels and at least one of left side wheels based on the longitudinal force, a third calculating device calculating a contribution rate of front wheels at a steering angle control and a contribution rate of rear wheels at the steering angle control, a fourth calculating device calculating a front wheel correction steering angle and a rear wheel correction steering angle based on the contribution rate of the front wheel, the contribution rate of the rear wheel, and a state quantity including the longitudinal force difference, and a driving device outputting a control command value based on the front wheel correction steering angle and the rear wheel correction steering angle.

11 Claims, 7 Drawing Sheets

STEERING ANGLE CONTROL APPARATUS FOR VEHICLE

CROSS REFERENCE TO RELATED APPLICATIONS

This application is based on and claims priority under 35 U.S.C. §119 with respect to Japanese Patent Application No. 2006-315630 filed on Nov. 22, 2006, the entire content of which is incorporated herein by reference.

FIELD OF THE INVENTION

The present invention relates to a steering angle control apparatus for a vehicle.

BACKGROUND

When a slippage restraining control for restraining slippage of a wheel, for example, an anti-skid control (i.e., anti-lock braking system control, or ABS control) or a traction control (i.e., TCS control), or the like, is executed while a vehicle is traveling on a road surface having different coefficients of function at wheels on the right and left sides (i.e., hereinafter referred to as a μ split road) (i.e., the slippage restraining control referred to as a μ split control hereinafter), differences (i.e., braking force difference when the ABS control is applied; driving force difference when the TCS control is applied) are generated between longitudinal forces (i.e., friction force in an acceleration or deceleration direction generated between a road surface and a tire; also referred to as driving/braking force) at wheels on the left side and right side. A yaw moment which deviates a trajectory of a vehicle based on the differences in longitudinal forces (i.e., hereinafter referred to as a longitudinal force difference-based yaw moment) is generated.

In order to restrain the deviation of the trajectory of the vehicle by the longitudinal force difference-based yaw movement, it is required to reduce (i.e., to cancel) the longitudinal force difference-based yaw moment by correcting steering angle of wheels in a reverse direction to the deviated direction of the vehicle by operating a steering wheel in a reverse direction to the deviated direction of the vehicle. The foregoing operation to correct the steering angle of the wheels in a reverse direction to the deviated direction of the vehicle is referred to as a counter steering operation. The counter steering operation requires that a driver be highly skilled.

In light of the foregoing, according to a known apparatus described in JP2540742B, pressure difference of hydraulic brake pressure of wheels at the right side and left side when braking is applied by an anti-skid control system, calculating corrected steering angle of rear wheels or front wheels of the vehicle in response to the pressure difference, and steering the rear wheels or the front wheels in response to the corrected steering angle so that braking is applied safely without changing a course of the vehicle even when a sudden braking operation is applied on a μ split road.

Notwithstanding, with a system which controls steering angles of the both front wheels and rear wheels of the vehicle on the basis of difference of the longitudinal forces between wheels on the right and on the left, it is required to determine steering angles considering a percentage of distribution of a stabilization moment to (i.e., a contribution rate of) front wheels and rear wheels in order to restrain the longitudinal force difference-based yaw moment.

A need thus exists for a steering angle control apparatus for a vehicle, which executes steering angle control of front wheels and rear wheels which restrains deviation of a vehicle by a yaw moment based on longitudinal force difference of wheels on the right side and on the left side on a μ split road (i.e., referred to as correcting steering angle control) and which determines a contribution rate of the front wheels and the rear wheels for the correcting steering angle control to restrain deviation of the vehicle on the μ split road.

SUMMARY OF THE INVENTION

In light of the foregoing, a steering angle control apparatus for a vehicle, which controls a steering angle of front wheels and rear wheels for a vehicle at which a slip restraining control for adjusting a longitudinal force of at least one of the wheels is executed in order to restrain a slip of the wheel and a μ split control is executed for executing the slip restraining control during the vehicle travels on a μ split road having different frictional coefficients at a portion on which at least one of left side wheels rotates and a portion on which at least one of right side wheels rotates. The steering angle control apparatus for the vehicle includes a first calculating means calculating the longitudinal force, a second calculating means calculating a longitudinal force difference between said at least one of the right side wheels and said at least one of the left side wheels based on the longitudinal force, a third calculating means calculating a contribution rate of the front wheels at the steering angle control and a contribution rate of the rear wheels at the steering angle control, a fourth calculating means calculating, a front wheel correction steering angle and a rear wheel correction steering angle based on the contribution rate of the front wheel, the contribution rate of the rear wheel, and a state quantity including the longitudinal force difference, and a driving means outputting a control command value based on the front wheel correction steering angle and the rear wheel correction steering angle.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to illustrations of drawing figures as follows.

Figure 1:
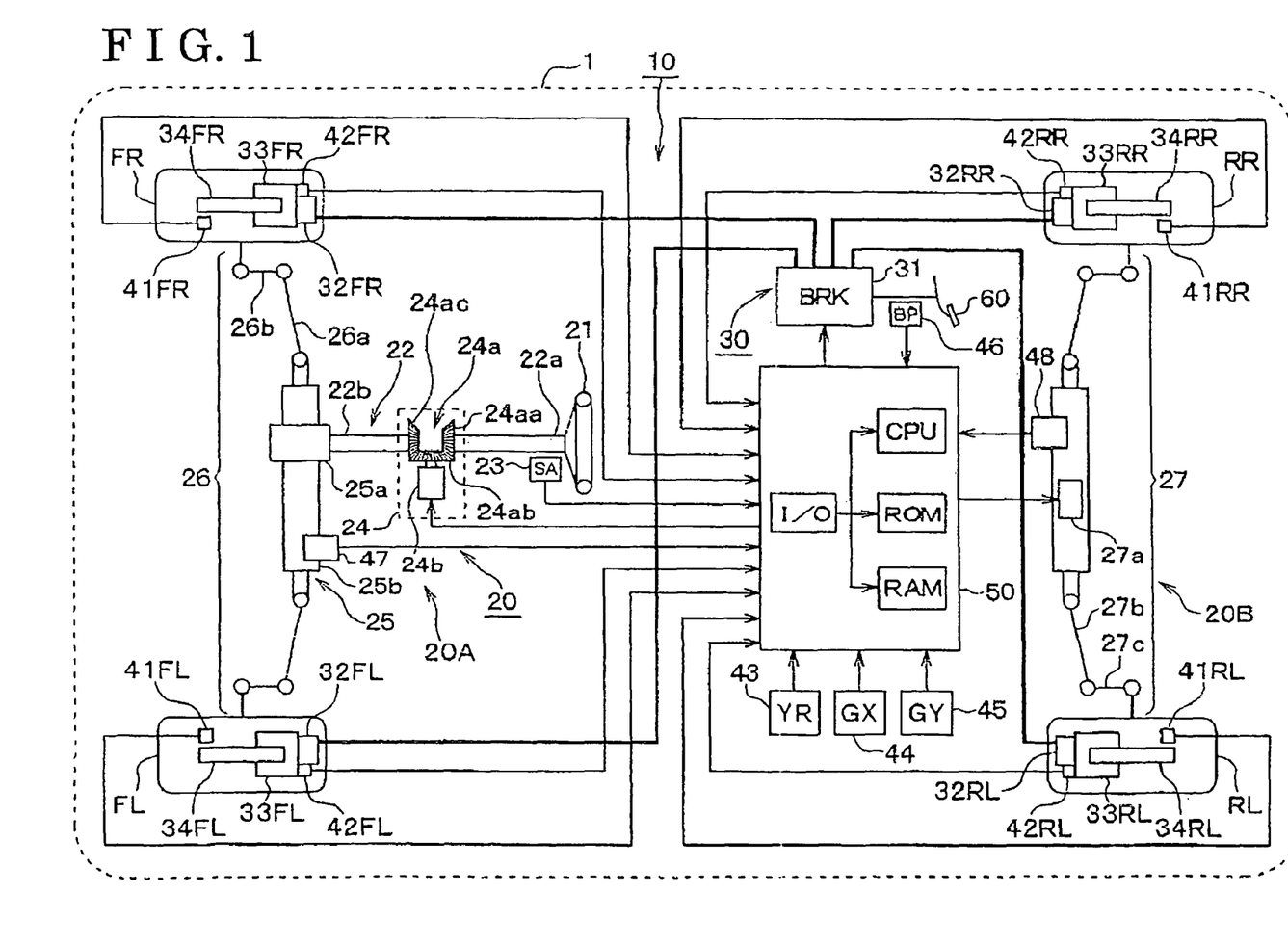
FIG. 1 is a schematic view showing an overall structure of a motion control mechanism for a vehicle which includes a steering angle control apparatus according to a first embodiment of the present invention.

Referring to FIG. 1, constructions of a motion control mechanism 10 for a vehicle 1 and detailed constructions of a steering angle control apparatus according to the first embodiment of the present invention will be explained.

As shown in FIG. 1, the motion control mechanism 10 includes a steering angle control mechanism 20, a brake control mechanism 30, various sensors 41-48, and an electronic control apparatus (i.e., hereinafter referred to as an ECU) 50 which serves as the steering angle control apparatus.

The steering angle control mechanism 20, which controls steering by controlling steering angle, includes a front wheel steering angle control mechanism 20A and a rear wheel steering angle control mechanism 20B. The steering angle control mechanism 20 adjusts an angle (i.e., a steering angle) of front wheels FL, FR and rear wheels RL, RR which serve as steered wheels relative to the centerline of a vehicle.

As shown in FIG. 1, the front wheel steering angle control mechanism 20A includes a steering wheel 21, a steering shaft 22, a steering angle sensor 23, a steering gear ratio variable mechanism (i.e., variable gear ratio steering (VGRS)) 24, a steering gear mechanism 25, and a steering link mechanism 26 so as to adjust a steering angle of the front wheels FL, FR relative to the centerline of the vehicle.

The steering wheel 21 corresponds to a steering operation member which is operated by a driver. When the driver operates the steering wheel 21, the steering shaft 22 is rotated via, for example, a steering column.

The steering shaft 22 transmits the steering operation by the driver to wheels to be steered. The steering shaft 22 is divided into a portion 22a close to the steering wheel 21 (i.e., hereinafter referred to as a upper shift 22a) and a portion 22b close to the steering gear mechanism 25 (i.e., hereinafter referred to a bottom shaft 22b). A steering angle applied by the operation of the steering wheel 21 by the driver per se is transmitted to the upper shaft 22a. The steering angle transmitted to the upper shaft 22a is adjusted by the VGRS 24 and is transmitted to the bottom shaft 22b.

The front wheel steering angle control mechanism 20A includes a steering angle sensor 23 to obtain rotation angle (i.e., steering angle) of the steering wheel 21 by the driver.

The VGRS 24 includes a gear mechanism portion 24a and a motor 24b. The VGRS 24 relatively rotates the bottom shaft 22b to the upper shaft 22a by controlling the absolute rotation angle of the motor 24 to adjust a ratio of steering angle of the front wheels FL, FR on the left and on the right (i.e., steering gear ratio) relative to the rotation angle of the steering wheel 21.

The VGRS 24, for example, is structured by a planetary gear including a sun gear 24aa which is connected to the upper shaft 22a, a ring gear 24ab which is connected to the motor 24b, and a carrier 24ac which is connected to the bottom shaft 22b. By controlling the rotation angle of the motor 24b of the VGRS 24, a relationship of a rotation angle (i.e., steering angle) of the steering wheel 21 and a steering angle of the front wheels FR, FL on the right side and left side serving as wheels to be steered is controlled.

The steering gear mechanism 25 is structured by combining gears, for example, a rack-and-pinion type. Upon the rotation of the bottom shaft 22b, a pinion gear 25a comes to have a rotation angle, and the rotating movement of the pinion gear 25a is converted into a reciprocating movement of a rack 25b by the rack 25b which is geared with the pinion gear 25a.

The steering link mechanism 26 transmits a force transmitted from the steering gear mechanism 25 to a knuckle arm 26b via a tie rod 26a, or the like. Accordingly, front wheels FL, FR on the left and the right are steered directing in the identical direction.

The rear wheel steering angle control mechanism 20B is configured to steer rear wheels RL, RR on the left side and on the right side. The rear wheel steering angle control mechanism 20B includes a link mechanism 27 which is structured basically similar to the steering link mechanism 26. Upon an activation of a motor 27a by a motor control signal from the ECU 50, the rotational movement of the motor 27a is converted into the force which reciprocates a tie rod 27b to be transmitted to a knuckle arm 27c, and thus the rear wheels RL, RR on the left side and right side are steered.

The brake control mechanism 30 controls pressure (i.e., hereinafter referred to as wheel cylinder pressure) generated at each wheel cylinder (i.e., hereinafter also referred to as W/C) 32FR, 32FL, 32RR, 32RL each provided at wheels FR, FL, RR, RL respectively using an actuator 31 for brake hydraulic pressure control which executes an anti-skid control (i.e., an Anti-lock Braking System control; hereinafter referred to as ABS control), a Traction Control (i.e., hereinafter referred to as TCS control), or a vehicle stability control (i.e., an Electronic Stability Control, or ESC). The actuator 31 for brake hydraulic pressure control includes plural solenoid valves, a reservoir, a pump, and a motor, or the like. A known hydraulic pressure brake system which generates the wheel cylinder pressure hydraulic pressure or a known electric brake system, for example, a brake-by-wire which generates Wheel cylinder pressure electrically may be applied as the actuator 31 for brake hydraulic pressure control. Explanations for structures of the actuator 31 for brake hydraulic pressure control will be omitted because known constructions are applied.

In the foregoing explanations, FL stands for a front wheel on the left, FR stands for a front wheel on the right, RL stands for a rear wheel on the left, and RR stands for a rear wheel on the right.

The brake control mechanism 30 generates brake hydraulic pressure at each of the wheel cylinders 32FR, 32FL, 32RR, 32RF in response to an operation of a brake pedal 60 when the ABS control, the TCS control, or the ESC control is not executed (i.e., at normal braking state). In response to the generation of the brake hydraulic pressure at each of the wheel cylinders 32FR, 32FL, 32RR, 32RF, a brake pad is pushed towards each of disc rotors 34FR, 34FL, 34RR, 34RF by calipers 33FR, 33FL, 33RR, 33RF respectively to generate a braking torque. When the ABS control, the TCS control, or the ESC control is executed, pressure of one or more of the wheel cylinder 32FR, 32FL, 32RR, 32RF which is/are an object/objects to be controlled independently from an operation of the brake pedal 60 is adjusted so that the braking torque is adjusted.

The various sensors 41-48 generate detection signals applied for controls, for example, a steering angle control, the ABS control, the TCS control, and the ESC control. Particularly, a wheel speed sensor 41FR, 41FL, 41RR, 41RL and a wheel cylinder pressure sensor 42FR, 42FL, 42RR, 42RL are provided at each of the wheels FR, FL, RR, RL respectively. Further, a yaw rate sensor 43, a longitudinal acceleration sensor 44, a lateral acceleration sensor 45, and a pedal operation rate sensor 46 are provided at the motion control mechanism 10 of the vehicle 1. Still further, the steering link mechanism 26 includes a steering angle sensor 47 which detects an actual steering angle of the front wheels FL, FR, and the link mechanism 27 includes a steering angle sensor 48 which detects an actual steering angle of the real wheels RL, RR. Detected signals by the sensors 41-48 are inputted into the ECU 50.

The ECU 50 receives signals detected by the steering angle sensor 23 and the various sensors 41-48 to generate motor control signals each indicating a control command value in response to each of the detected signals. Further, the ECU 50 activates the actuator 31 for brake hydraulic pressure control to execute a $\mu$ split control (i.e., a slip restraining control for restraining slippage of a wheel executed during vehicle's traveling on a road surface having different coefficients of friction at wheels on the right and left sides (i.e., hereinafter referred as a $\mu$ split road)) in addition to the normal ABS control, TCS control, or ESC control, and to correct the control command value of the motor control signal in response to a control state of the $\mu$ split control. Accordingly, the ECU 50 performs a steering angle control to adjust a steering angle of the front wheels FL, FR on the left side and the right side and/or a steering angle of the rear wheels RL, RR on the left side and the right side. Although the ECU 50 which integrally performs various controls is applied according to the first embodiment, control may be performed by combining plural control units mounted on the vehicle 1 by communication buses. The plural control units, for example, include a braking and driving force control unit, a front wheel steering angle control unit, a rear wheel steering angle control unit, a power steering control unit, and a power train control unit.

Figure 2:
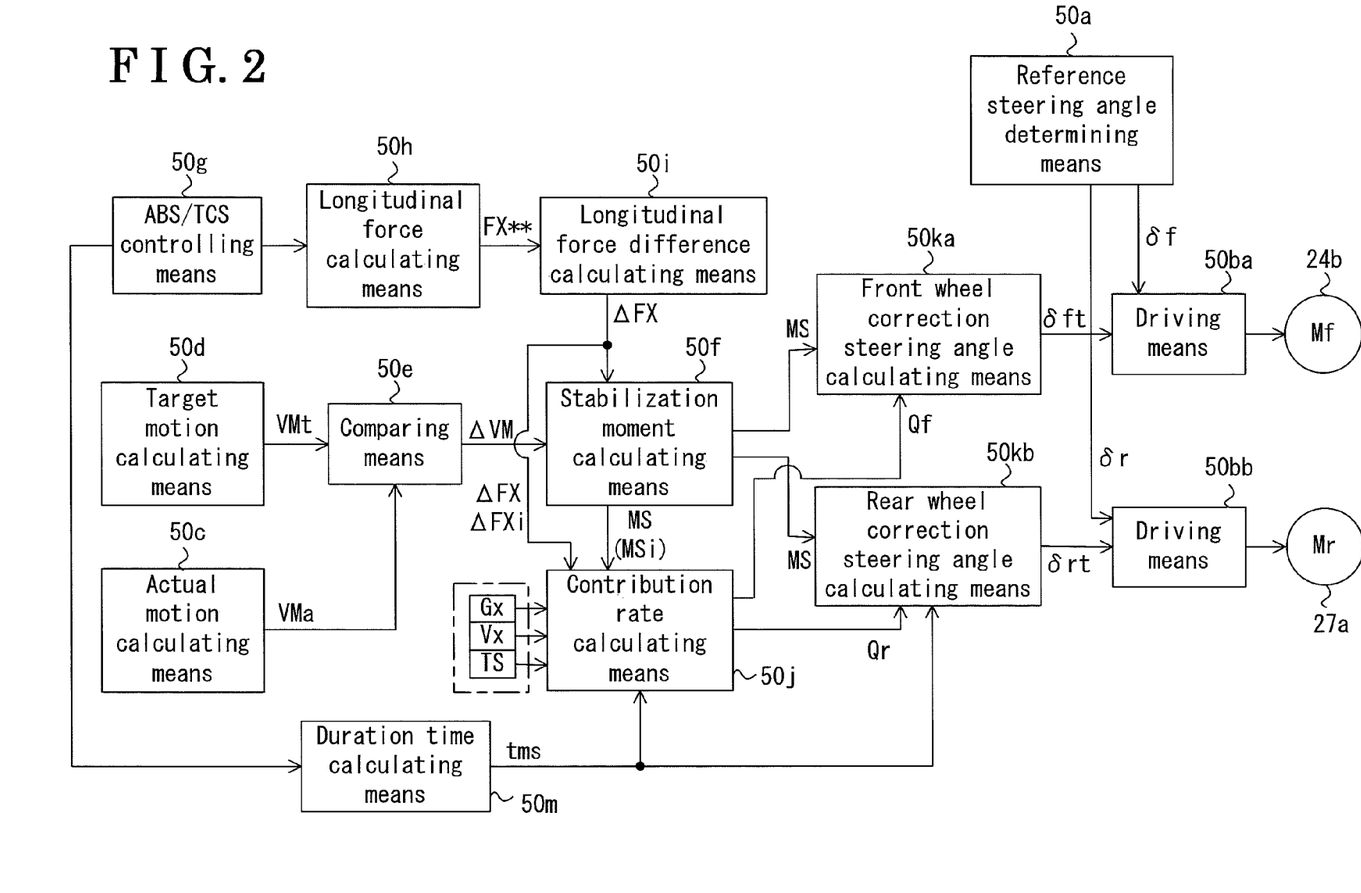
FIG. 2 is a block view showing a steering angle control in an ECU (i.e., particularly, CPU) according to the first embodiment of the present invention.

Referring to FIG. 2, each control block for a steering angle control performed in the ECU 50 (i.e., particularly, in CPU) will be explained. The steering angle control includes a reference steering angle control and a correction steering angle control. In the reference steering angle control for the front wheels FL, FR (i.e., hereinafter referred to as a front wheel reference steering angle control), a transmission ratio (i.e., referred to as a front wheel steering ratio hereinafter) between a rotation angle (i.e., steering angle) of the steering wheel 21 and a steering angle of steered wheels (e.g., front wheels FL, FR) is controlled, for example, on the basis of vehicle speed. Namely, the front reference steering angle control is a front wheel steering ratio control in response to a level of the vehicle speed, or the like. In a reference steering angle control for the rear wheels RL, RR (i.e., hereinafter, refereed to as a rear wheel reference steering angle control), a ratio of steering angle of the rear wheels RL, RR relative to the steering angle of the front wheels FL, FR (i.e., hereinafter referred to as a rear wheel steering ratio) is controlled on the basis of, for example, vehicle speed. Namely, the rear wheel reference steering angle control is a rear wheel steering angle control in response to the level of the vehicle speed, or the like. Meanwhile, in the correction steering angle control, a steering angle of the front wheels and/or rear wheels is corrected and adjusted in order to cancel a longitudinal force difference based yaw moment which is generated when the $\mu$ split control is operated. In other words, the correction steering angle control is a steering angle control for the front wheels FL, FR and/or the rear wheels RL, RR which generates a yaw moment for stabilizing a vehicle during the $\mu$ split control.

As shown in FIG. 2, the ECU 50 includes a reference steering angle determining means 50a and driving means 50ba, 50bb.

Figure 12A:
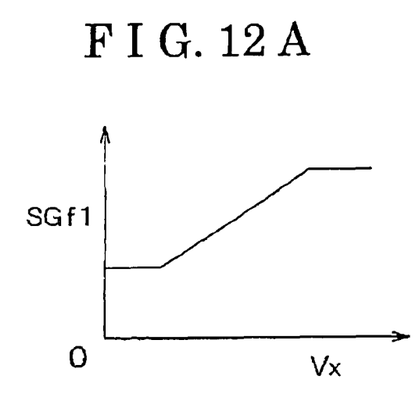
FIG. 12A is a map showing a vehicle speed sensitive parameter SGf1 based on vehicle speed Vx according to the second embodiment of the present invention.
Figure 12B:
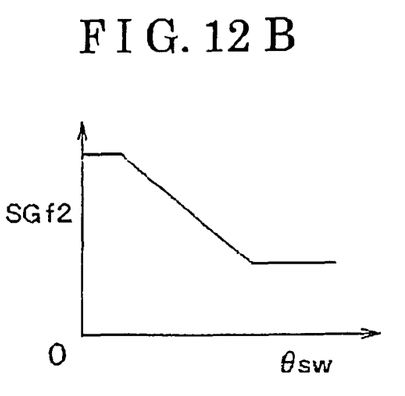
FIG. 12B is a map showing a steering angle sensitive parameter SGf2 based on steering angle θsw of a steering wheel according to the second embodiment of the present invention.

The reference steering angle determining means 50a obtains a reference target value of a steering angle of the front wheels and the rear wheels in response to the operation of the steering wheel 21 by the driver. Particularly, the reference steering angle determining means 50a obtains a front wheel steering ratio SGf on the basis of vehicle speed Vx, a steering angle $\theta$sw of the steering wheel 21, and a map or a formula which indicates the relationship between the front wheel steering ratio SGf and the vehicle speed Vx and between the front wheel steering ration SGf and the steering angle $\theta$sw. In those circumstances, the front wheel steering ratio SGf is a transmission ratio between the steering wheel steering angle $\theta$sw and a steering angle of steered wheels (i.e., front wheels FL, FR). FIG. 12A shows a map for a vehicle speed sensitive parameter SGf1 based on the vehicle speed Vx and FIG. 12B shows a map for a steering angle sensitive parameter SGf2 based on the steering wheel steering angle $\theta$sw. The front wheel steering ratio SGf is calculated as an added value of the vehicle speed sensitive parameter SGf1 and the steering angle sensitive parameter SGf2 (i.e., SGf=SGf1+SGf2). As shown in the maps in FIGS. 12A and 12B, the front wheel steering ratio SGf is determined to be greater as the vehicle speed Vx increases and is determined to be less as the steering wheel steering angle $\theta$sw increases. The vehicle speed Vx is obtained by a known method on the basis of each wheel speed VwFR, VwFL, VwRR, VwRL which is obtained from detected signals of the wheel speed sensor 41FR, 41FL, 41RR, 41RL. The steering wheel steering angle $\theta$sw is obtained on the basis of detected signals of the steering angle sensor 23. The reference steering angle determining means 50a obtains a front wheel reference steering angle $\delta$f on the basis of the front wheel steering ratio SGf and the steering wheel steering angle $\theta$sw. Namely, the front wheel reference steering angle $\delta$f is a target value which adjusts a relative position (i.e., angle) of the steering wheel 21 to the front wheels FL, FR in order to obtain the front wheel steering ratio SGf (i.e., particularly, the front wheel reference steering angle $\delta$f is a target value of a rotation angle of the motor 24b).

Figure 13:
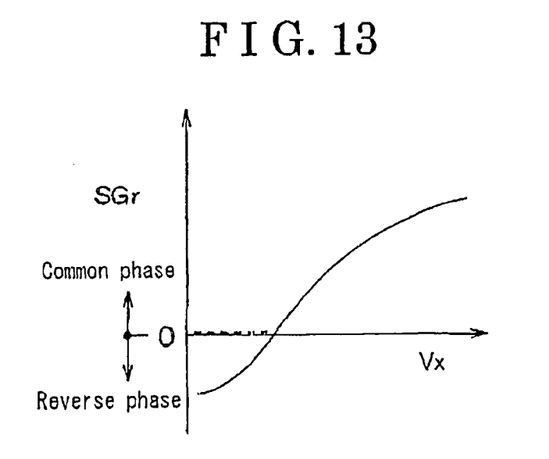
FIG. 13 is a map showing relationship between vehicle speed Vx and rear wheel steering ratio SGr.

Further, the reference steering angle determining means 50a obtains a reference target value of a steering angle of the rear wheels Rl, RR. Particularly, the reference steering angle determining means 50a obtains a rear wheel steering ratio SGr on the basis of the vehicle speed Vx and a map or a formula which shows a relationship between the vehicle speed Vx and the rear wheel steering ratio SGr. The rear wheel steering ratio SGr is a ratio of a steering angle of the rear wheels RL, RR relative to a steering angle of the front wheels FL, FR. As shown in FIG. 13, the rear wheel steering ratio SGr is set to be a reverse phase (i.e., a state where the front wheels FL, FR and the rear wheels RL, RR are in reverse steering directions; negative value in the map in FIG. 13) when the vehicle speed Vx is low. And the rear wheel steering ratio SGr is changed to be a greater value of a common phase (i.e., a state where the front wheels FL, FR and the rear wheels RL, RR are in an identical steering direction; a positive value in the map in FIG. 13) as the vehicle speed Vx increases. Further, when the vehicle speed Vx is low, the rear wheel steering ratio SGr may be set to be zero, or null so that the rear wheel steering ratio SGr is not set to be the reverse phase during a low speed state (i.e. indicated with a dotted line in FIG. 13). The reference steering angle determining means 50a calculates a steering angle of the front wheels FL, FR using the front wheel steering ratio SGf which is determined based on the steering wheel steering angle θsw and the vehicle speed, or the like. Further, the reference steering angle determining means 50a obtains a rear reference steering angle δr on the basis of the front wheel steering angle (=θsw/SGf) and the rear wheel steering ration SGr. Namely, the rear reference steering angle δr is a target value of a rear steering angle (i.e., particularly, a target value of a rotational angle of the motor 27a) in order to obtain the rear wheel steering ratio control in response to the vehicle speed.

The driving means 50ba, 50bb output motor control signals for making the front wheels FR, FL and the rear wheels RR, RL have the front wheel reference steering angle δf and the rear wheel reference steering angle δr to the motor 24b and the motor 27a respectively to perform the steering angle control in a normal state (i.e., in a state where the correction steering angle control is not in operation). In a case where the correction steering angle control is required to be performed, the front wheel reference steering angle δf and the rear wheel reference steering angle δr are adjusted by a front wheel correction steering angle δft and a rear wheel correction steering angle δrt respectively to obtain a final steering angle target value, and the motor control signal is converted into a control command value corresponding to the steering angle target value. Accordingly, the motor control signal after the conversion is outputted to the motor 24b and/or the motor 27a.

The ECU 50 includes an actual motion calculating means 50c, a target motion calculating means 50d, a comparing means 50e, a stabilization moment calculating means 50f, an ABS/TCS controlling means 50g, a longitudinal force calculating means (i.e., serving as a first calculating means) 50h, a longitudinal force difference calculating means 50i (i.e., serving as a second calculating means), a contribution rate calculating means 50j (i.e., serving as a third calculating means), a front wheel correction steering angle calculating means 50ka (i.e., serving as a fourth calculating means), and a rear wheel correction steering angle calculating means 50kb (i.e., serving as a fourth calculating means), as means for obtaining correction steering angles of the front wheels FL, FR and the rear wheels RL, RR in order to execute the correction steering angle control in response to the μ split control. The actual motion calculating means 50c calculates a quantity of motion VMa which is actually generated at the vehicle 1 (i.e., hereinafter referred to as an actual motion quantity). In those circumstances, the quantity of motion is defined as a state quantity indicating a turning motion of a vehicle and is calculated using at least one of values corresponding to a yaw, rate, a lateral acceleration, a vehicle slip angle, and a vehicle slip angular velocity. For example, an actual yaw rate, which is actually generated on the basis of a detection signal of the yaw rate sensor 43, is calculated.

The target motion calculating means 50d calculates a quantity of motion VMt which the vehicle 1 targets for (i.e., hereinafter referred to as a target motion quantity), and calculates a state quantity of an aspect identical to the aspect of the actuation motion quantity. For example, when the motion quantity is a yaw rate, a targeted yaw rate which is obtained by a known method is calculated on the basis of the detection signal by the steering angle sensor 23 and the vehicle speed.

Although an object of the actual motion quantity Vma and the target motion quantity VMt is yaw rate, another state quantity (e.g., vehicle body slippage angle) which is known to be applied for ESC control may also be applied.

The comparing means 50e calculates a deviation ΔVM of the actual motion quantity VMa and the target motion quantity VMt. The stabilization moment calculating means 50f calculates stabilization moment MS (i.e., serving as a state quantity including the longitudinal force difference) using the deviation ΔVM obtained by the comparing means 50e and longitudinal force difference ΔFX obtained by a longitudinal force difference calculating means 50i. Particularly, the stabilization moment MS is obtained by substituting the deviation ΔVM and the longitudinal force difference ΔFX in equation 1 shown below. In equation 1, G1 and G2 are predetermined coefficients.

$$MS = G1 \cdot \Delta FX + G2 \cdot \Delta VM \quad \text{[Equation 1]}$$

The ABS/TCS controlling means 50g obtains the wheel speed VwFR, VwFL, VwRR, VwRL and vehicle body speed (i.e., estimated vehicle body speed) on the basis of the detected signal from the wheel speed sensor 41FR, 41FL, 41RR, 41RL and obtains slip ratio for each of the wheels FL, FR, RL, RR to execute the ABS control or the TCS control, or the like, based on the slip ratio. In the ABS control, wheel slip is restrained by adjusting braking torque by reducing, maintaining, or increasing pressure of the wheel cylinder of the objective wheel by the actuator 31 for brake hydraulic pressure control. In the TCS control, wheel slip is restrained by adjusting driving torque by adjusting output of an engine, or by increasing, maintaining, or reducing the pressure of the wheel cylinder by the actuator 31 for brake hydraulic pressure control. Explanations for control methods in ABS control and TCS control will not be repeated here because known methods are applied. A control target value of each of the wheels FL, FR, RL, RR under the ABS control or TCS control is obtained by the ABS/TCS control means 50g, and the control target value is transmitted to a longitudinal force calculating means 50h.

The longitudinal force calculating means 50h calculates longitudinal force PXFR, FXFL, FXRR, FXRL for each of the wheels FR, FL, RR, RL. The longitudinal force is a frictional force in a direction of acceleration and deceleration which is generated between a road surface and a tire, that is, a braking force. Particularly, the longitudinal force FXFR, FXFL, FXRR, FXFL for each of the wheels FR, FL, RR, RL is obtained by a known method for obtaining a braking torque of each of the wheels FR, FL, RR, RL on the basis of the control target value of the wheel cylinder pressure of each of the wheels FR, FL, RR, RL under the ABS control or the TCS control.

The longitudinal force FXFR, FXFL, FXRR, FXRL may be obtained on the basis of a braking torque of each of the wheels FR, FL, RR, RL obtained applying the wheel cylinder pressure of each of the wheels FR, FL, RR, RL detected from the detected signal of the wheel cylinder pressure sensor 42FR, 42FL, 42RR, 42RL, a driving torque of each of the wheels FR, FL, RR, RL obtained from a driving torque of the engine, acceleration and deceleration of each of the wheels FR, FL, RR, RL obtained by differentiating wheel speed VWFR, VWFL, VWRR, VWRL, equations of motion of rotation of each of the wheels FR, FL, RR, RL, an operational state of the actuator 31 for brake hydraulic pressure control (i.e., command electric current value to a solenoid valve), or other known methods.

The longitudinal force difference calculating means 50i calculates a difference ΔFX of the longitudinal force FXFR, FXFL, FXRR, FXRL (i.e., hereinafter referred to as the longitudinal force difference ΔFX) between at least one of wheels FR, FL on the left side and one of wheels FR, RR on the right side on the basis of the longitudinal force FXFR, FXFL, FXRR, FXRL of each of the wheels FR, FL, RR, RL obtained by the longitudinal force calculating means 50h. Because, on the μ split road, a frictional coefficient of at least one of wheels on the right is different from a frictional coefficient of at least one of wheels on the left side, when the split control is executed, a longitudinal force of at least one of the wheels FL, RL on the left side and a longitudinal force of at least one of the wheels FR, RR on the right side are different from each other, and the longitudinal force difference ΔFX is generated. The longitudinal force difference ΔFX is a physical quantity corresponding to the degree of the longitudinal force difference based yaw moment.

For example, as the longitudinal force difference ΔFX, a value subtracting the sum of the longitudinal forces FXFL, FXRL of front and rear wheels FL, RL on the left side from the sum of the longitudinal forces FXFR, FXRR of the front and rear wheels FR, RR on the right side may be applied. Signs (i.e., either positive or negative) of the longitudinal force difference ΔFX are changed depending on rotational direction (i.e., in a clockwise direction or a counterclockwise direction viewing from above the vehicle). Either direction can be determined to be positive or negative. The longitudinal force difference ΔFX calculated by the longitudinal force difference calculating means 50i is transmitted to the stabilization moment calculating means 50f to obtain the stabilization moment MS.

The contribution rate calculating means 50j calculates contribution Qf of correction steering angle control to the front wheels FL, FR (i.e., hereinafter referred to as front wheel contribution Qf) and contribution Qr of the correction steering angle control to the rear wheels RL, RR (i.e., hereinafter referred to as rear wheel contribution Qr) based on traveling state of the vehicle and duration time tms from start of the μ split control. In other words, the contribution rate calculating means 50j calculates percentages of distribution of the stabilization moment MS relative to the front wheels FL, FR and the rear wheels RL, RR. Methods for calculating the contributions Qf, Qr will be explained in details hereinafter.

The front wheel correction steering angle calculating means 50ka and the rear wheel correction steering angle calculating means 50kb calculate the front wheel correction steering angle δft and the rear wheel correction steering angle δrt based on the front wheel contribution Qf and the rear wheel contribution Qr respectively and based on the stabilization moment MS. When the front wheel correction steering angle δft is obtained, a final target value of the front wheel steering angle is obtained on the basis of the front wheel reference steering angle δf and the front wheel correction steering angle δft by the driving means 50ba, and a motor control signal showing a control command value corresponding to the final target value is outputted to the motor 24b. Further, when the rear wheel correction steering angle δrt is obtained, a target value of a final rear wheel steering angle is obtained on the basis of the rear wheel reference steering angle δr and the rear wheel correction steering angle δrt, and a motor control signal indicating a control command value corresponding to the target value is outputted to the motor 27a.

Figure 3:
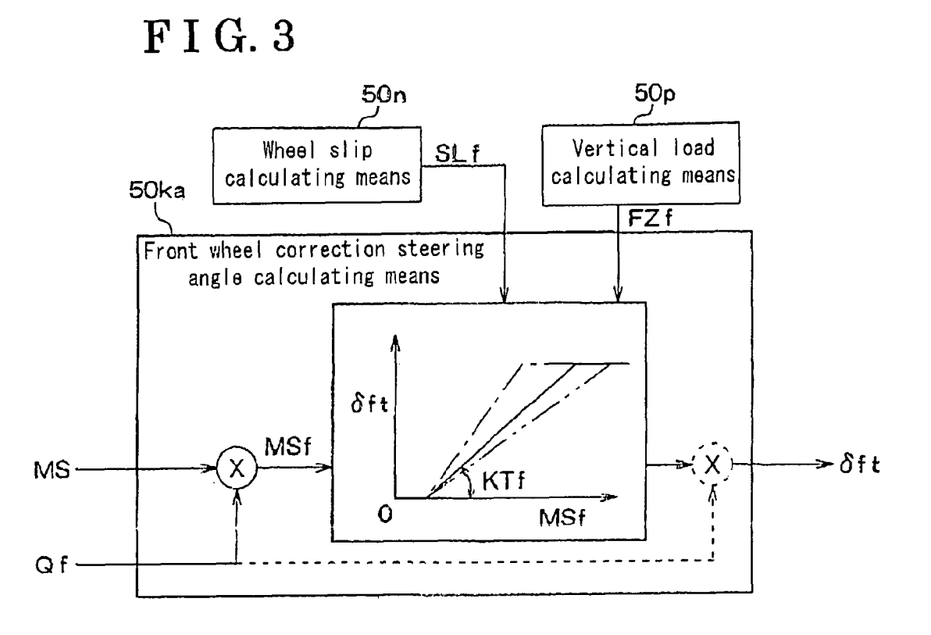
FIG. 3 is a block diagram of a front wheel correction steering angle calculating means according to the first embodiment of the present invention.

A method for obtaining the front wheel correction steering angle δft and the rear wheel correction steering angle ort will be explained as follows. As shown in FIG. 3, according to the front wheel correction steering angle calculating means 50ka, a front wheel stabilization moment MSf which is applied by the front wheel contribution Qf by multiplying the front wheel contribution Qf to the stabilization moment MS is obtained. The front wheel connection steering angle δft is calculated by applying equations or a map indicating a relationship between the front wheel correction steering angle δft and the front wheel stabilization moment MSf memorized in the front wheel correction steering angle calculating means 50ka. For example, the front wheel correction steering angle δft is calculated from equations shown below. Because the front wheel correction steering angle δft is obtained as indicated in equation 3, the gradient KTf of the front wheel correction steering angle δft relative to the front wheel stabilization moment MSf is obtained as shown in equation 4.

$$\delta ft = KTf \cdot MSf \quad \text{[Equation 2]}$$

$$\delta ft = MSf/(Kf \cdot Lf) \quad \text{[Equation 3]}$$

$$KTf = 1/(Kf \cdot Lf) \quad \text{[Equation 4]}$$

Here, Lf stands for a distance from the center of gravity of the vehicle to an axle of the front wheels (See FIG. 5) and Kf stands for cornering stiffness of the front wheels FR, FL. The cornering stiffness Kf of the front wheels FL, FR varies in response to slip (i.e., longitudinal slip, that is either driving slip or braking slip) of the front wheels FL, FR and vertical load at the front wheels. Thus, although the gradient KTf may also be determined as a constant value, it is preferable that the ECU 50 includes a wheel slip calculating means 50n which obtains front wheel slip SLf and a vertical load calculating means 50p which obtains a vertical load FZf at the front wheels FR, FL, and the gradient KTf is adjusted on the basis of at least one of the front wheel slip SLf and the front wheel vertical load FZf as shown in FIG. 3.

Figure 4A:
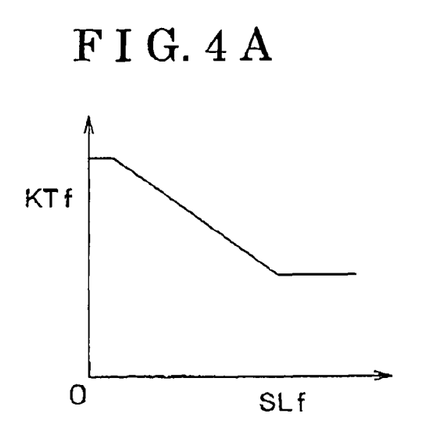
FIG. 4A is a graph showing a relationship between a front wheel slip and a gradient KTf according to the first embodiment of the present invention.
Figure 4B:
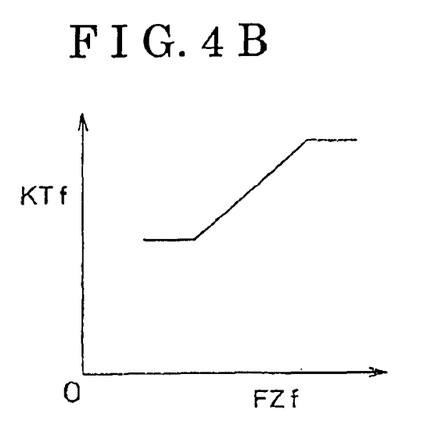
FIG. 4B is a graph showing a relationship between front wheel vertical load FZf and the gradient KTf according to the first embodiment of the present invention.

As shown in FIGS. 4A, 4B, the gradient KTf is reduced as the front slip SLf increases, and the gradient KTf is increased as the front wheel vertical load FZf increases. The front wheel slip is obtained from the deviation between vehicle body speed (i.e., estimated vehicle body speed) Vso and wheel speed VwFR, VwFL, VwRR, VwRL of each of the wheels FR, FL, RR, RL obtained by the ABS/TCS control means 50g. The front wheel vertical load FZf is calculated by equation 5 shown below.

$$FZf = FZfo + G3 \cdot Gx + G4 \cdot Gy \quad \text{[Equation 5]}$$

Here, FZfo stands for static load of the front wheels Fr, FL, Gx stands for longitudinal acceleration, Gy stands for lateral acceleration, and G3 and G4 are coefficients. The static load FZfo of the front wheels FR, FL is varied depending on types of vehicle, however, the static load FZfo is treated as a known constant because it can be attained by searching in advance.

Although the front wheel correction steering angle δft is obtained on the basis of the front wheel stabilization moment MSf in which the front wheel contribution Qf is multiplied to the stabilization moment MS, according to the foregoing explanations, a final front wheel correction steering angle δft may be obtained by obtaining a front wheel correction steering angle based on corresponding stabilization moment MS, first, and by multiplying front wheel contribution Qf to the front wheel correction steering angle. A rear wheel correction steering angle calculating means 50*kb* is constructed similar to the front wheel correction steering angle calculating means 50*ka* explained above. Namely, a rear wheel correction steering angle δrt is obtained similar to the front wheel correction steering angle δft by replacing suffixes Qf, MSf, δft, KTf, SLf, FZf, Kf, Lf, Fzfo by Qr, MSr, δrt, KTr, SLr, FZr, Kr, Lr, Fzro.

The ECU 50 further includes a duration time calculating means 50*n*. The duration time calculating means 50*m* calculates a duration time tms after the start of μ split control. Because a sudden longitudinal force difference-based yaw moment is generated immediately after the start of the μ split control, it is difficult for a driver to perform a counter-steer operation following the generation of the longitudinal force difference-based yaw moment. However, after an elapse of a predetermined time after the start of the μ split control, the driver is able to perform the counter-steer operation in response to the generation of the yaw moment, and thus, it is acceptable to end the correction steering angle control. In the meantime, in case a steering direction of the front wheels FR, FL and a steering direction of the rear wheels RR, RL are in reverse pleases, when the wheels FR, RR on the right side and the wheels FL, RL on the left side rotates on road surfaces having even road surface frictional coefficient after the start of the μ split control (i.e., hereinafter referred to as μ even surface), a phenomenon where the vehicle moves inward in a turning direction (i.e., turning radius is reduced) may be caused. Thus, by calculating the duration time tms of the correction steering angle control from the start of the μ split control by the duration time calculating means 50*m* and by transmitting the duration time tms to the contribution calculating means 50*j* and the rear wheel correction steering angle calculating means 50*kb*, calculation, or the like, of the contribution rates of the front wheels FR, FL and rear wheels RR, RL at the correction steering control in response to the duration time tms is performed. In those circumstances, whether the μ split control is started is judged, for example, by a flag which is set during the μ split control is switched from a reset state to a set state by the ABS/TCS control means 50*g*.

The ECU 50 is constructed in the foregoing manner. Details of how to obtain the front wheel contribution. Qf and the rear wheel contribution Qr of the correction steering angle control will be explained as follows. The front wheel contribution Qf and the rear wheel contribution Qr basically are determined to have a default value (i.e., reference value) based on vehicle characteristics, however, a final value of the front wheel contribution Qf and the rear wheel contribution Qr is calculated considering the traveling state of the vehicle and the duration time tms from the start of the μ split control.

Figure 5:
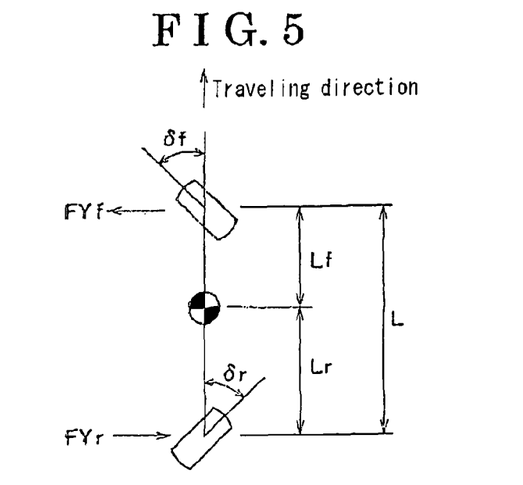
FIG. 5 is a view showing a vehicle state when a steering angle correcting control is performed according to the first embodiment of the present invention.

A method for obtaining the default value will be explained with reference to a view showing a vehicle state when the correction steering angle control is performed as shown in FIG. 5. For the explanatory purpose, FIG. 5 shows states of front and rear wheels FR, RR on the right side of the vehicle.

The default values of the front wheel contribution Qf and the rear wheel contribution Qr are basically determined, so that a sum of the front wheel contribution Qf and the rear wheel contribution Qr assumes one (i.e., 1), that is, so that the rear wheel contribution Qr is a value subtracting the front wheel contribution Qf from one (i.e., 1−Qf). As explained above, by multiplying the front wheel constitution Qf and the rear wheel contribution Qr to the stabilization moment MS, the front wheel stabilization moment MSf and the rear wheel stabilization moment MSr are obtained respectively (See equations 6, 7).

$$MSf = Qf \cdot MS \quad \text{[Equation 6]}$$

$$MSr = Qr \cdot MS \quad \text{[Equation 7]}$$

In the meantime, as shown in FIG. 5, where a wheel base (i.e., a distance between a front wheel axle and a rear wheel axle) is defined as L, distances from the center of gravity of the vehicle to the axles of the front wheel FR and the rear wheel RR are defined as Lf and Lr respectively, and cornering forces at the front wheel FR and the rear wheel RR are defined as FYf and FYr respectively, the front wheel stabilization moment MSf and the rear wheel stabilization moment MSr are determined by multiplying each of the distances Lf, Lr to each of the cornering forces FYf, FYr. Accordingly, equations 8 and 9 are established.

$$MSf = FYf \cdot Lf = Qf \cdot MS \quad \text{[Equation 8]}$$

$$MSr = FYr \cdot Lr = Qr \cdot MS \quad \text{[Equation 9]}$$

In those circumstances, FYf=FYr is a condition for making the lateral movement of the vehicle be completely zero during the correction steering angle control. By transforming equations 8, 9 in order to meet the foregoing condition, equation 10 is obtained. Based on equation 10 and Qr=1−Qf, the front wheel contribution Qf and the rear wheel contribution Qr obtain solutions shown in equations 11 and 12 respectively.

$$(Qf \cdot MS)/Lf = (Qr \cdot MS)/Lr \quad \text{[Equation 10]}$$

$$Qf = Lf/(Lf + Lr) = Lf/L \quad \text{[Equation 11]}$$

$$Qr = Lr/(Lf + Lr) = Lr/L \quad \text{[Equation 12]}$$

Accordingly, the front wheel contribution Qf and the rear wheel contribution Qr are determined based on the ratios of the distance Lf, Lr from the center of the gravity of the vehicle to the axles of the front wheel FR and the rear wheel RR respectively relative to the wheel base L, and a distribution ratio of the stabilization moment MS to the front wheels FL, FR and to the rear wheels RL, RR is obtained, accordingly. Thus, the front wheel contribution Qf and the rear wheel contribution Qr by which the lateral movement of the vehicle assumes to be zero are applied as default values.

A method for obtaining the front wheel contribution Qf and the rear wheel contribution Qr when considering a traveling state of the vehicle and the duration time tms from the start of the μ split control will be explained as follows. In those circumstances, the traveling state of the vehicle indicates the vehicle speed VX, the turning state quantity TS, a state quantity including the longitudinal force difference ΔFX (i.e., the longitudinal force difference ΔFX and the stabilization moment MS), and the longitudinal acceleration Gx, or the like.

Figure 6:
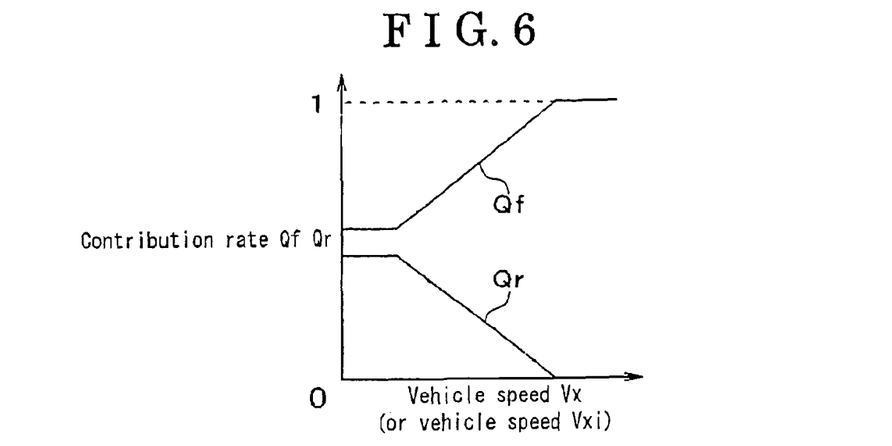
FIG. 6 is a map showing relationship of front wheels contribution rate Qf and rear wheels contribution rate Qr relative to vehicle speed Vx according to the first embodiment of the present invention.

As shown in FIG. 6, the correction steering angle of the rear wheels RL, RR performed during the μ split control assumes a reverse phase (i.e., the steering direction is in reverse direction) relative to the correction steering angle of the front wheels FL, FR. Thus, when the vehicle enters in the μ even surface from the μ split road, there is a possibility that the phenomenon where the vehicle moves inward in a turning direction (i.e., turning radius is reduced) is generated. Because the phenomenon where the vehicle moves inward in a turning direction (i.e., turning radius is reduced) is likely to be generated as the vehicle speed increases, as shown in FIG. 6, it is preferable that the front wheel contribution Qf is increased and the rear wheel contribution Qr is reduced as the vehicle speed VX increases. When the vehicle speed is equal to or greater than a predetermined level, the rear wheel contribution Qr may be determined to be zero, so that the correction steering angle control is executed only by the front wheels FL, FR. Although the vehicle speed Vx indicates values which momentarily change during the μ split control, in terms of accomplishing the vehicle stability, taking vehicle speed Vxi at the start of the μ split control into consideration is sufficient. Thus, as shown in FIG. 6, the front wheel contribution Qf and the rear wheel contribution Qr may be determined at the start of the μ split control based on a map indicating the relationship of the front wheel contribution Qf and the rear wheel contribution Qr relative to the vehicle speed Vxi by applying the vehicle speed Vxi at the start of the μ split control in place of the vehicle speed Vx.

Figure 7:
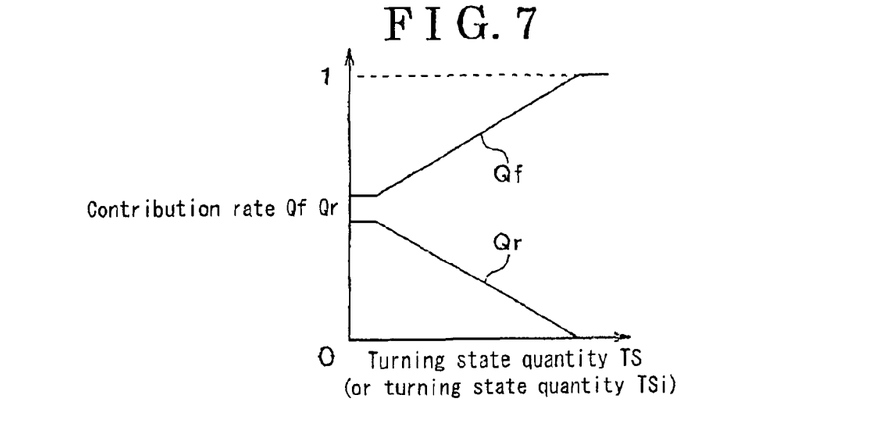
FIG. 7 is a map showing relationship of the front wheels contribution rate Qf and the rear wheels contribution rate Qr relative to turning state quantity TS according to the first embodiment of the present invention.

FIG. 7 shows a map indicating the relationship between the front wheel contribution Qf and the rear wheel contribution Qr relative to the turning state quantity TS of the vehicle. The turning state quantity TS indicates a physical quantity showing the turning state of the vehicle, including a steering wheel angle, a yaw rate Yr, and lateral acceleration Gy, or the like. The front wheel contribution Qf and the rear wheel contribution Qr are determined by applying the state quantity which is calculated based on at least one of the physical quantities showing the turning state of the vehicle (i.e., the steering wheel angle, the yaw rate Yr, and the lateral acceleration. Gy, or the like) as the turning state quantity TS. In those circumstances, likewise the explanations for the vehicle speed Vx, in order to ensure the vehicle stability when the vehicle enters the μ even surface from the μ split road, as shown in FIG. 7, it is preferable that the front wheel contribution Qf increases and the rear wheel contribution Qr declines as the turning state quantity TS is higher. Further, when the turning state quantity TS is equal to or greater than a predetermined value, the rear wheel contribution Qr is determined to be zero, so that the correction steering angle control is executed only at the front wheels FL, FR. In those circumstances, although the turning state quantity TS indicates values which momentarily change even during the μ split control, in terms of accomplishing the vehicle stability, taking a turning state quantity TSi at the start of the μ split control into consideration is sufficient. Thus, as shown in FIG. 7, the front wheel contribution Qf and the rear wheel contribution Qr may be determined at the start of the μ split control based on the map indicating the relationship of the front wheel contribution Qf and the rear wheel contribution Qr relative to the turning state quantity TSi by applying the turning state quantity TSi at the start of the μ split control in place of the turning state quantity TS.

Figure 8:
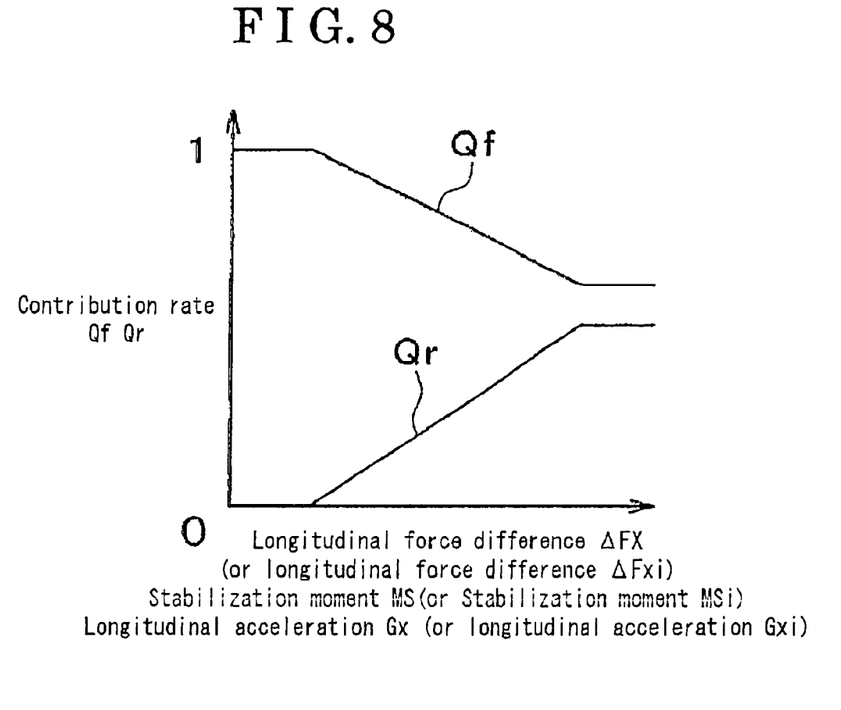
FIG. 8 is a map showing relationship of the front wheels contribution rate Qf and the rear wheels contribution rate Qr relative to a longitudinal force difference ΔFX, stabilization moment MS calculated using the longitudinal force difference ΔFX, or longitudinal acceleration Gx according to the first embodiment of the present invention.

FIG. 8 shows a map indicating the relationship of the front wheel contribution Qf and the rear wheel contribution Qr relative to the longitudinal force difference ΔFX, relative to the stabilization moment MS which is calculated using the longitudinal force difference ΔFX, or relative to the longitudinal acceleration Gx. When a degree of the longitudinal force difference ΔFX or the stabilization moment MS, calculated using the longitudinal force difference ΔFX, is relatively large, the vehicle may be stabilized by the correction steering angle control of the both front wheels FL, FR and the rear wheels RL, RR. Whereas, when the degree of the longitudinal force difference ΔFX or the stabilization moment MS calculated using the longitudinal force difference ΔFX is relatively small, adequate effects are obtained only by the correction steering angle control at the front wheels FL, FR. Accordingly, when the longitudinal force difference ΔFX or the stabilization moment MS, calculated by applying the longitudinal force difference ΔFX, is less than a predetermined value, the rear wheel contribution Qr to the correction steering angle control is assumed to be zero. As the longitudinal force difference ΔFX or the stabilization moment MS, calculated using the longitudinal force difference ΔFX, increases, the front wheel contribution Qf is reduced and the rear wheel contribution Qr is increased.

When the μ split control is in operation and the degree of the longitudinal acceleration Gx is relatively large, the traveling surface having μ split road includes an asphalt or concrete surface which is dry or wet on one side and the asphalt or concrete surface which is covered with snow or frozen on the other side, which corresponds to a state where the longitudinal force difference ΔFX is large. On the other hand, when the μ split control is in operation and the degree of the longitudinal acceleration Gx is relatively small, the traveling surface having μ split road includes an asphalt or concrete surface which is covered with snow on one side and the asphalt or concrete surface which is frozen on the other side, which corresponds to a state where the longitudinal force difference ΔFX is small. Thus, when the longitudinal acceleration Gx is equal to or less than a predetermined value, the rear wheel contribution Qr may be set to be zero, so that the correction steering angle control is performed only by the front wheels FL, FR, and as the degree of the longitudinal acceleration Gx increases, the front wheel contribution Qf may be reduced and the rear wheel contribution Qr may be increased.

Although the longitudinal force difference ΔFX, the stabilization moment MS, and the longitudinal acceleration Gx are values that momentarily change even during the μ split control, in terms of accomplishing the vehicle stabilization, taking the longitudinal force difference ΔFX, the stabilization moment MS, or the longitudinal acceleration Gx immediately after the start of the μ split control into consideration is sufficient. Thus, as shown in FIG. 8, a longitudinal force difference ΔFX, a stabilization moment MS, and a longitudinal acceleration Gx, immediately after the start of the μ split control may be applied in place of the longitudinal force difference ΔFX, the stabilization moment MS, and the longitudinal acceleration Gx, so that the front wheel contribution Qf and the rear wheel contribution Qr are determined immediately after the start of the μ split control based on the map indicating the relationship of the front wheel contribution Qf and the rear wheel contribution Qr relative to the longitudinal force difference ΔFXi, the stabilization moment MSi, or the longitudinal acceleration Gxi.

Accordingly, the front wheel contribution Qf and the rear wheel contribution Qr are obtained. In those circumstances, the front wheel contribution Qf and the rear wheel contribution Qr may be changed from default values considering every parameter of the vehicle speed Vx, Vxi, the turning state quantity TS, TSi, the longitudinal force difference ΔFX, ΔFXi, the stabilization moment MS, MSi, and the longitudinal acceleration Gx, Gxi. The front wheel contribution Qf and the rear wheel contribution Qr may also be obtained by considering any one of or plural ones of the vehicle speed Vx, Vxi, the turning state quantity TS, TSi, the longitudinal force difference ΔFX, ΔFXi, the stabilization moment MS, MSi, and the longitudinal acceleration Gx, Gxi.

Figure 9:
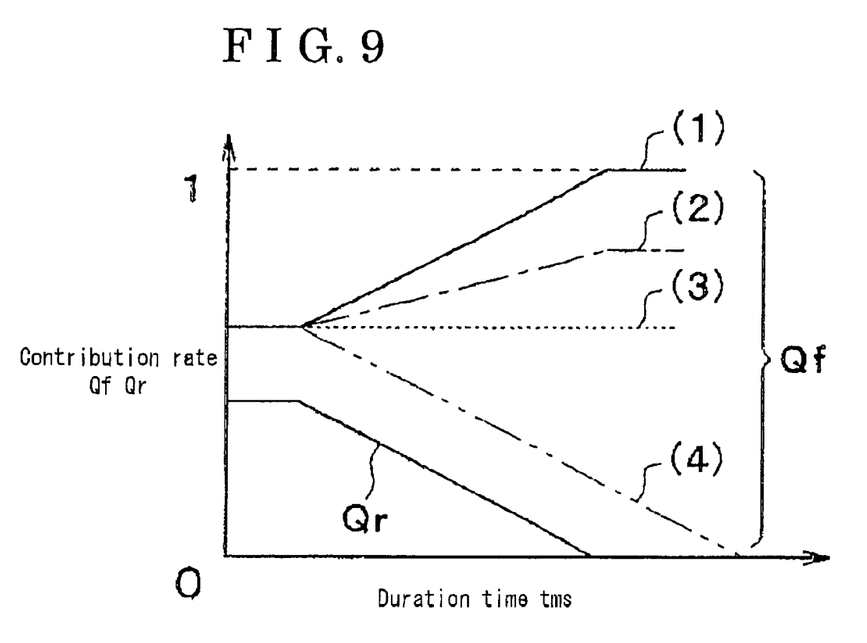
FIG. 9 is a map showing a relationship of the front wheels contribution rate Qf and the rear wheels contribution rate Qr relative to a duration time tms from starting μ split control according to the first embodiment of the present invention.

FIG. 9 shows a map indicating the relationship of the front wheel contribution Qf and the rear wheel contribution Qr relative to the duration time tms after the start of the μ split control. Because a counter-steer operation which should be executed at the start of the μ split control requires that the driver be highly skilled, it is preferable to have a support by the correction steering angle control at an initial stage of the μ split control. However, having an assumption that the traveling surface changes from the μ split road to the μ even surface as time goes by from the start of the μ split control, it is preferable to reduce the rear wheel contribution Qr because of the reasons explained above. Because the driver is able to respond to the generation of the longitudinal force difference-based yaw moment adequately and is able to perform the counter-steer operation after an elapse of some time from the start of the μ split control, the correction steering angle control may be ended. Accordingly, the rear wheel contribution Qr is declined in response to the duration time tms, the rear wheel contribution Qr is determined to be zero after the duration time tms reaches a predetermined value, and the front wheel contribution. Qf is determined in response to the duration time tms.

For example, as shown in (1) in FIG. 1, the front wheel contribution Qf increases as the duration time tms is greater. In those circumstances, the decrement of the rear wheel contribution Qr is compensated by the increment of the front wheel contribution Qf. Namely, the front wheel contribution Qf is adjusted, so that the sum of the front wheel contribution Qf and the rear wheel contribution Qr assumes one (i.e., 1). In the foregoing manner, effects of the correction steering angle control are maintained even when the duration time tms is longer.

Further, as shown in (2) in FIG. 9, although the sum of the front wheel contribution Qf and the rear wheel contribution Qr is less than one (i.e., 1), the front wheel contribution Qf increases as the duration time tms becomes longer. In the foregoing manner, although the stabilization moment MS affecting the vehicle decrements, the effects of the correction steering angle control are maintained even if the duration time tms is longer, and thus the driver is able to respond to the generation of the longitudinal force difference-based yaw moment adequately.

Still further, as indicated with (3) in FIG. 9, the front wheel contribution Qf may be maintained to be constant even if the duration time tms becomes long. As indicated with (4) in FIG. 9, the front wheel contribution Qf may be reduced likewise the rear wheel contribution Qr as the duration time tms becomes long. Accordingly, the counter-steer operation by the driver is compensated by the correction steering angle control at the start of the μ split control.

An operation of the ECU 50 when the μ split control starts will be explained as follows. According to the ECU 50 constructed as the foregoing, when the longitudinal forces FXFR, FXFL, FXRR, FXRL of the wheels FR, FL, RR, RL are obtained, the longitudinal force difference ΔFX is obtained based thereon. Thereafter, when the deviation ΔVM of the actual motion quantity VMa and the target motion quantity VMt is calculated, the stabilization moment MS is calculated based on the deviation ΔVM and the longitudinal force difference ΔFX. The contribution Qf of the front wheels FL, FR and the contribution Qr of the rear wheels RL, RR at the correction steering angle control are obtained based on the stabilization moment MS, and the front wheel correction steering angle δft and the rear wheel correction steering angle δrt in which the respective contributions Qf, Qr are applied relative to the stabilization moment MS are calculated. A final steering angle target value of the front wheels FL, FR is obtained by adjusting the front wheel reference steering angle δf, which is for performing the front wheel steering ratio control (i.e., control of transmission ratio of the steering wheel relative to the steering wheel 21) in response to the vehicle body speed, by the front wheel correction steering angle δft. Accordingly, a motor control signal indicating a control command value corresponding to the steering angle target value is outputted to the motor 24b of the VGRS 24. A final steering angle target value of the rear wheels RR, RL is obtained by adjusting the rear wheel reference steering angle δr, which is for performing the rear wheel steering ratio control in response to the vehicle body speed VX (i.e., control for a ratio of the rear wheel steering angle relative to the front wheel steering angle), by the rear wheel correction steering angle ort. Accordingly, a motor control signal indicating a control command value corresponding to the final steering angle target value of the rear wheels RR, RL is outputted to a motor 27a of the rear wheel steering angle control mechanism 20B.

As explained above, with the construction of the steering angle control apparatus according to the embodiment, at the correction steering angle control for generating, by adjusting steering angles of the front wheels FL, FR and/or the rear wheels RL, RR, a yaw moment for canceling a yaw moment which is generated by the braking force difference and the driving force difference of the right and left wheels when the μ split control, which executes a slip restraining control, is operated by the ABS control or the TCS control at the μ split road at which a surface where the wheels on the right side rotate and a surface where the wheels on the left side rotate has different frictional coefficients, the front wheel correction steering angle δft is obtained based on the contribution Qf of (i.e., distribution ratio to) the front wheels FR, FL, and the rear wheel correction steering angle δrt is obtained based on the contribution Qr of (i.e., distribution ratio to) the rear wheels RR, RL. Accordingly, the correction steering angle control considering the distribution ratio to the front wheels FR, FL and the rear wheels RR, RL is executed and deviation of the vehicle at the μ split road is favorably restrained.

Further, the final front wheel contribution Qf and the final rear wheel contribution Qr are obtained considering at least one of the traveling state of the vehicle, the state quantity (e.g., the stabilization moment MS or the longitudinal force difference ΔFX) including elements of the longitudinal force difference ΔFX, and the duration time tms from the start of the μ split control. Accordingly, distribution ratio to the front wheels FR, FL and the rear wheels RR, RL at the correction steering angle control in response to the traveling state, or the like, is obtained favorably, and the deviation of the vehicle at the μ split road is favorably restrained.

A second embodiment will be explained as follows. According to the second embodiment, transactions performed at the ECU 50 are different from the first embodiment and other constructions are identical to the first embodiment. Explanations for the common constructions to the first embodiment will not be repeated.

A steering control according to the second embodiment will be explained with reference to FIG. 10.

Figure 10:
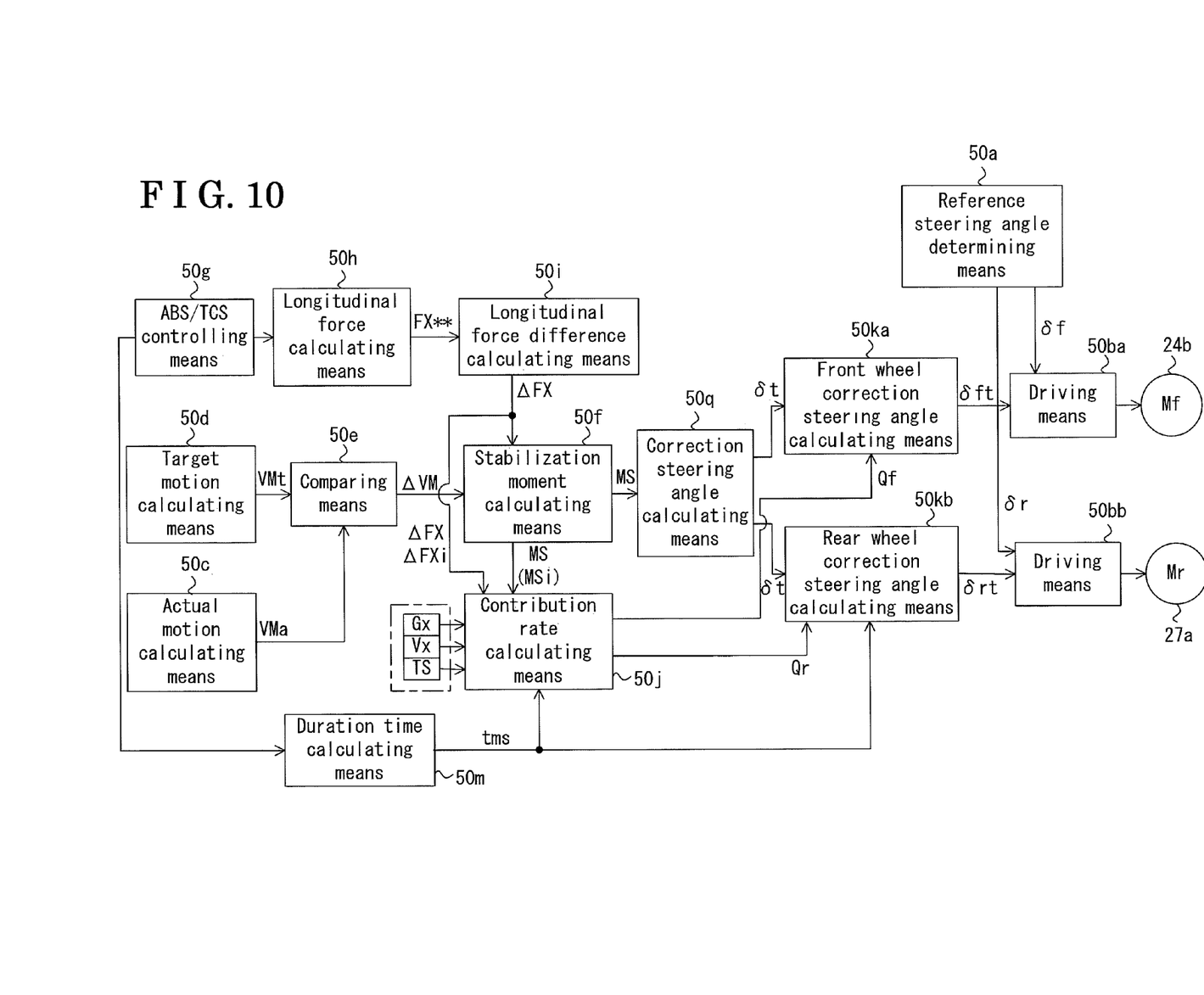
FIG. 10 is a block view showing a steering angle control in the ECU according to a second embodiment of the present invention.

As shown in FIG. 10, according to the second embodiment, a correction steering angle calculating means 50q is additionally provided at an upstream side of the front wheel correction steering angle calculating means 50ka and the rear wheel correction steering angle calculating means 50kb.

Figure 11:
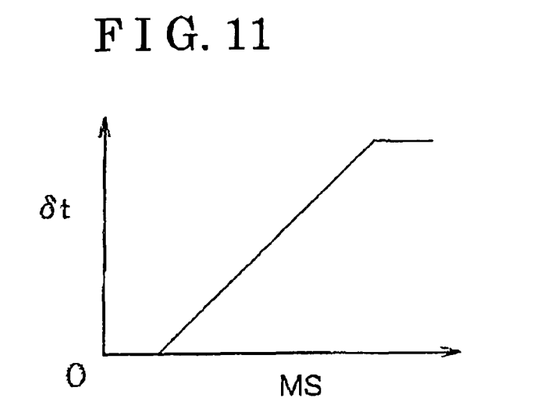
FIG. 11 is a map showing a relationship of a correcting steering angle δt relative to the stabilization moment MS according to the second embodiment of the present invention.

In the first embodiment, the front wheel correction steering angle δft and the rear wheel correction steering angle δrt are calculated based on the stabilization moment MS, the front wheel contribution Qf and the rear wheel contribution Qr. According to the second embodiment, a correction steering angle δt of the entire system is calculated in advance based on the stabilization moment MS, and the front wheel correction steering angle δft and the rear wheel correction steering angle δrt are calculated based on the correction steering angle δt, the front wheel contribution Qf and the rear wheel contribution Qr. Particularly, the correction steering angle δt is pre-calculated based on the stabilization moment MS at the correction steering angle calculating means 50q. The relationship of the correction steering angle δt relative to the stabilization moment MS is as shown in FIG. 11. By multiplying the front wheel contribution Qf and the rear wheel contribution Qr relative to the correction steering angle δt as indicated in equation 13 and equation 14 respectively, the front wheel correction steering angle δft and the rear wheel correction steering angle δrt are calculated.

$$\delta ft = Qf \times \delta t \quad \text{[Equation 13]}$$

$$\delta rt = Qr \times \delta t \quad \text{[Equation 14]}$$

In the foregoing manner, effects similar to the first embodiment are obtained by calculating the correction steering angle δt of entire system in advance based on the stabilization moment MS and by calculating the front wheel correction steering angle δft and the rear wheel correction steering angle δrt based on the correction steering angle δt and the front wheel contribution Qf and the rear wheel contribution Qr.

Variations of constructions of the embodiments will be explained as follows. Although the brake control mechanism 30 is described as a mechanism which provides a brake torque to the wheels FR, FL, RR, RL based on the hydraulic pressure brake applied by the actuator 31 for the brake hydraulic pressure control in the embodiments explained above, a mechanism which provides a brake torque to the wheels FR, FL, RR, RL by generating the wheel cylinder pressure by an electric motor similar to an electric brake, or by directly pushing a brake pad to a disc rotor may be applied. With this construction, for example, the brake torque is obtained based on a control command value of the electric motor.

Although the value which is calculated by subtracting the sum of the longitudinal force FXFL, FXRL of the wheels FL, RL on the left side from the sum of the longitudinal forces FXFR, FXRR of the wheels FR, RR on the right side is applied as the longitudinal force difference ΔFX in the embodiments explained above, in case the longitudinal force difference is the braking force difference, a value obtained by subtracting the longitudinal force (i.e., braking force) FXfl of the front wheel FL on the left side from the longitudinal force (i.e., braking force) FXfr of the front wheel FR on the right side may be applied as a longitudinal force difference ΔFX between wheels on the right and on the left. Further, in case the longitudinal force difference is the driving force difference, a value obtained by subtracting the longitudinal force (i.e., driving force) of the driving wheel on the left side from the longitudinal force (i.e., driving force) of the driving wheel on the right side may be applied as the longitudinal force difference ΔFX between wheels on the right and on the left.

Further, although the embodiments of the present invention are applied to the steering angle control apparatus which also performs the correction steering angle control in which the vehicle motion state is fed back, the correction steering angle control based on the feedback of the vehicle motion state may be omitted. With this construction, the ECU 50 does not include the actual motion calculating means 50c, the target motion calculating means 50d, the comparing means 50e, and the stabilization moment calculating means 50f which are shown in FIG. 2. Then, in place of the stabilization moment MS, the front wheel correction steering angle δft and the rear wheel correction steering angle δrt are obtained by applying the longitudinal force difference ΔFX per se.

According to the subject matter of the steering angle control apparatus for the vehicle, the contribution rate Qf of the front wheels FR, FL and the contribution rate Qr of the rear wheels RR, RL at the correction steering angle control are obtained, and the front wheel correction steering angle δft and the rear wheel correction steering angle δrt are calculated based on the contribution rate Qf and the contribution rate Qr respectively. Accordingly, the steering angle is controlled considering the contribution rates Qf, Qr of the front wheels FR, FL and the rear wheels RR, RL at the correction steering angle control, and thus the deviation of the vehicle on the μ split road is favorably restrained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A steering angle control apparatus for a vehicle, which controls a steering angle of front wheels and rear wheels for a vehicle at which a slip restraining control for adjusting a longitudinal force of at least one of the wheels is executed in order to restrain a slip of the wheel and a μ split control is executed for executing the slip restraining control during the time the vehicle travels on a μ split road having different frictional coefficients at a portion of the road on which at least one of left side wheels rotates and a portion of the road on which at least one of right side wheels rotates, comprising:
   a first calculating unit for calculating the longitudinal force;
   a second calculating unit for calculating a longitudinal force difference between said at least one of the right side wheels and said at least one of the left side wheels based on the longitudinal force;
   a third calculating unit for calculating a contribution rate of the front wheels at the steering angle control and a contribution rate of the rear wheels at the steering angle control;
   a fourth calculating unit for calculating a front wheel correction steering angle and a rear wheel correction steering angle based on the contribution rate of the front wheel, the contribution rate of the rear wheel, and a state quantity including the longitudinal force difference; and
   a driving unit for outputting a control command value based on the front wheel correction steering angle and the rear wheel correction steering angle.

2. The steering angle control apparatus for the vehicle according to claim 1, wherein the third calculating unit calculates the contribution rate of the front wheel and the contribution rate of the rear wheel based on at least one of a duration time from a start of the μ split control, the state quantity including the longitudinal force difference, and a vehicle motion state.

3. The steering angle control apparatus for the vehicle according to claim 2, wherein the vehicle motion state includes a turning state quantity, and the fourth calculating unit reduces the contribution rate of the rear wheel in response to an increase of the turning state quantity.

4. The steering angle control apparatus for the vehicle according to claim 3, wherein the fourth calculating unit sets the contribution rate of the rear wheel to be zero when the turning state quantity is equal to or greater than a predetermined value.

5. The steering angle control apparatus for the vehicle according to claim 3, wherein the fourth calculating unit applies a turning state quantity at the start of the μ split control as the turning state quantity.

6. The steering angle control apparatus for the vehicle according to claim 2, wherein the vehicle motion state includes a vehicle speed, and the fourth calculating unit reduces the contribution rate of the rear wheel in response to an increase of the vehicle speed.

7. The steering angle control apparatus for the vehicle according to claim 6, wherein the fourth calculating unit sets the contribution rate of the rear wheel to be zero when the vehicle speed is equal to or greater than a predetermined value.

8. The steering angle control apparatus for the vehicle according to claim 6, wherein the fourth calculating unit applies a vehicle speed at the start of the μ split control as the vehicle speed.

9. The steering angle control apparatus for the vehicle according to claim 2, wherein the fourth calculating unit reduces the contribution rate of the rear wheel in response to an increase of the duration time from the start of the μ split control.

10. The steering angle control apparatus for the vehicle according to claim 9, wherein the fourth calculating unit sets the contribution rate of the rear wheel to be zero when the duration time from the start of the μ split control is equal to or greater than a predetermined value.

11. The steering angle control apparatus for the vehicle according to claim 1, wherein the fourth calculating unit calculates the front wheel correction steering angle and the rear wheel correction steering angle either based on a value multiplying the contribution rates of the front wheel and the rear wheel by the state quantity including the longitudinal force difference, or by obtaining a front wheel steering angle and a rear wheel steering angle corresponding to the state quantity including the longitudinal force difference and multiplying the contribution rates of the front wheel and the rear wheel by the front wheel steering angle and the rear wheel steering angle respectively.

* * * * *